UNITED STATES PATENT OFFICE.

JULIUS KIRCHER, OF NEW YORK, N. Y.

IMPROVEMENT IN OBTAINING SULPHUR, SULPHURIC ACID, AND SULPHURETS OF SODIUM AND POTASSIUM FROM GAS-LIME, &c.

Specification forming part of Letters Patent No. 137,692, dated April 8, 1873; application filed September 21, 1872.

*To all whom it may concern:*

Be it known that I, JULIUS KIRCHER, of the State, county, and city of New York, have invented a certain process of obtaining cheaply sulphuric acid, flowers of sulphur, lac sulphur, sulphuret of sodium, and sulphuret of potassium from the refuse lime which has been used to cleanse and purify coal-gas in gas manufactures, of which the following is a specification:

My method of doing the same is as follows:

First. To produce sulphuric acid: I take the refuse lime or iron which has been used in gas-factories to cleanse coal-gas, and which, for convenience, I call "gas-lime" or "gas-iron," and place it in an iron or other suitable retort, and heat it to a temperature of 300° Fahrenheit, and pass over it steam heated to a temperature of 600° Fahrenheit so long as sulphuret of hydrogen is evolved. The sulphuret of hydrogen, in form of vapor, is received in lead or other suitable chambers, and there ignited with an admixture of atmospheric air. The result of this combustion is the production of water and sulphurous acid. I next mix with this the vapor of nitric acid in the proportion of one and one-half per cent. to the total quantity of gas-lime or gas-iron used when sulphuric acid and the oxide of nitrogen are formed. This oxide of nitrogen may, by mixture with air, be again transformed into hyponitric acid, and be used again and again to transform fresh quantities of sulphurous acid into sulphuric acid. The accumulated nitrogen may be removed by valves. The sulphuric acid thus obtained is diluted, and may be concentrated by evaporation.

By this method sulphuric acid to the amount of from forty to fifty per cent. by weight to the quantity of gas-lime or gas-iron used is obtained.

Second. To produce flowers of sulphur and lac sulphur: I place the gas-lime into an iron or other suitable retort, mixed with twenty per cent. of clay, loam, or sand. After charging the retort a tube is fastened to it, which communicates with a chamber provided with a valve. The retort is then heated to the red-hot state, and the excess of sulphur is sublimated and deposited in the chamber as flowers of sulphur. By this process about eighty per cent. of the sulphur contained in the gas-lime is obtained.

Lac sulphur is obtained from the gas-lime by mixing it with water and adding muriatic or any other kind of acid, so long as the sulphuret of hydrogen is evolved. The precipitate then formed is lac sulphur, and this also will be about eighty per cent. of the whole sulphur contained in the gas-lime.

Third. To produce sulphuret of sodium: I take one hundred pounds of gas-lime and mix it in a vat with either fifteen pounds of caustic soda, or thirty pounds of sulphate of soda, (Glauber salts,) or thirty pounds of carbonate of soda, or thirty-six pounds of soda-ash, but preferring caustic soda. This is thoroughly covered and well mixed for three or four hours, when it will have changed its color to a dirty white. If it does not change to this color by that time it is an indication that there is an excess of sulphur in the gas-lime, and it will be necessary to increase the quantity of caustic soda, or its equivalent, until the dirty-white color is produced. The original color of the gas-lime is an indication of the amount of sulphur in it—the darker the original gas-lime the larger the proportion of sulphur in it. After the mass has become of a dirty-white color the mass is allowed to remain quiet, when decomposition takes place, and sulphuret of sodium is formed in connection with either caustic lime or gypsum, or carbonate of lime, according as whether caustic soda, or sulphate of soda, or carbonate of soda, or soda-ash were used. The weight of the sulphuret of sodium so produced, though in a dry condition, will be equal to the weight of the sulphur in the gas-lime and of the caustic soda, or its equivalent, used, less the oxygen. The residuum of the lime or gypsum should fully pay the expense of the whole gas-lime used.

The article sulphuret of sodium so obtained by the use of caustic soda or sulphate of soda is purer than the article made the old way, caustic soda and sulphate of soda being purer than carbonate of soda and soda-ash, and in this process the lime absorbing the impurities.

Fourth. To produce sulphuret of potassium:

I take one hundred pounds of gas-lime and mix it in a vat with either fifteen pounds of caustic potash or thirty pounds of sulphate of potash, or thirty pounds of carbonate of potash, but preferring causic potash. This is thoroughly covered and well mixed for three or four hours, when it will have changed its color to a dirty white. If it does not change to this color by that time it is an indication that there is an excess of sulphur in the gas-lime, and it will be necessary to increase the quantity of caustic potash, or its equivalent, until the dirty-white color is produced. The original color of the gas-lime is an indication of the amount of sulphur in it—the darker the original gas-lime the larger the proportion of sulphur in it. After the mass has become of a dirty-white color the mass is allowed to remain quiet, when decomposition takes place, and sulphuret of potassium is formed in connection with either caustic lime, or gypsum, or carbonate of lime, according as to whether caustic potash, or sulphate of potash, or carbonate of potash were used. The weight of the sulphuret of potassium so produced, though in a dry condition, will be equal to the weight of the sulphur in the gas-lime and of the caustic potash, or its equivalent, used, less the oxygen. The residuum of lime or gypsum should fully pay the expense of the whole gas-lime used.

The article sulphuret of potassium so obtained by the use of caustic potash or sulphate of potash is purer than the article made in the old way, caustic potash and sulphate of potash being purer than carbonate of potash, and in this process the lime absorbing the impurities.

Gas-lime or gas-iron has been roasted and heated in order to produce sulphur, and the sulphur produced by condensation, after which the same is adapted to be manufactured into sulphuric acid by any of the well-known processes; such, therefore, is not claimed by me; but

Having thus described my invention, what I claim, and desire to secure by Letters Patent, is—

1. The union of heated refuse or gas lime or gas-iron with superheated steam, whereby sulphureted hydrogen is evolved, for the purpose of manufacturing sulphuric acid, substantially as set forth.

2. The flowers of sulphur or lac sulphur, produced from gas-lime, combined with loam, sand, or clay, or their equivalents, in the manner and by the means substantially as described.

3. Sulphuret of sodium or of potassium produced from gas-lime by subjecting the same to the action of caustic soda, or other alkali or salt, in the manner substantially as described.

JULIUS KIRCHER.

Witnesses:
 ALBERT BRACHVOYCE,
 LEWIS S. THOMAS.